United States Patent [19]

Leslie et al.

[11] Patent Number: 5,095,528

[45] Date of Patent: Mar. 10, 1992

[54] REPEATER WITH FEEDBACK OSCILLATION CONTROL

[75] Inventors: Samuel A. Leslie; Michael W. Evans, both of Forest, Va.

[73] Assignee: Orion Industries, Inc., Solon, Ohio

[21] Appl. No.: 684,136

[22] Filed: Apr. 11, 1991

Related U.S. Application Data

[63] Continuation of Ser. No. 263,730, Oct. 28, 1988, abandoned.

[51] Int. Cl.$^5$ .......................... H04B 1/60; H04B 7/14; H04Q 7/02
[52] U.S. Cl. ......................................... 455/10; 455/15; 455/33; 455/69
[58] Field of Search ................... 455/33, 34, 52, 54, 455/127, 69, 9, 10, 11, 15, 343

[56] References Cited

U.S. PATENT DOCUMENTS

| | | | |
|---|---|---|---|
| 4,054,837 | 10/1977 | Hibbs, Jr. et al. | 455/77 |
| 4,355,414 | 10/1982 | Inoue | 455/200 |
| 4,578,815 | 3/1986 | Persinotti | 455/33 |
| 4,613,990 | 9/1986 | Halpern | 455/52 |
| 4,636,741 | 1/1987 | Mitzlaff | 455/89 |
| 4,677,687 | 6/1987 | Matsuo | 455/10 |
| 4,704,734 | 11/1987 | Menich et al. | 455/33 |
| 4,731,866 | 3/1988 | Muratani | 455/9 |
| 4,776,032 | 10/1988 | Odute et al. | 455/10 |
| 4,811,421 | 3/1989 | Havel et al. | 455/126 |
| 4,870,696 | 9/1989 | Yorita | 455/33 |
| 4,870,698 | 9/1989 | Katsuyama et al. | 455/127 |

Primary Examiner—Reinhard J. Eisenzopf
Assistant Examiner—Lisa Charouel
Attorney, Agent, or Firm—Dressler, Goldsmith, Shore, Sutker, & Milnamow, Ltd.

[57] ABSTRACT

An apparatus for detecting excessive output power from a cellular radio telephone system booster includes input circuitry for receiving incoming radio frequency signals from a mobile source. Amplifiers are provided for amplifying the radio frequency signals either directly or by means of intermediate frequency channels. The output power amplifiers have variable gain. Circuitry detects when the transmitted radio frequency signals exceed a predetermine threshold and reduce the amplifier gain accordingly.

7 Claims, 4 Drawing Sheets

REPEATER WITH FEEDBACK OSCILLATION CONTROL

This application is a continuation of application Ser. No. 263,730, filed Oct. 28, 1988, now abandoned.

FIELD OF THE INVENTION

The invention pertains to radio frequency boosters or repeaters. More particularly, the invention pertains to variable gain repeater circuits including output power level detectors and control circuits for adjusting the overall gain so as to minimize excess output power conditions.

BACKGROUND OF THE INVENTION

Radio frequency repeaters have been used for many years in connection with various types of communication systems. Many of the known prior repeater systems were intended to be permanently mounted at a fixed location and to received signals from and transmit signals to other fixed locations.

Repeater or booster circuits are also known for use in connection with cellular mobile radio telephone systems. One such repeater is disclosed in copending and commonly assigned U.S. patent application Ser. No. 081,120 entitled BOOSTER filed Aug. 3, 1987 now U.S. Pat. No. 4,941,200. The disclosure and figures of that application are incorporated herein by reference.

Two problems have been noted with prior art booster systems used in a cellular radio telephone environment. In one instance, the mobile units can physically approach the booster and as a result thereof supply to the booster a continually increasing input signal. This can result in the booster transmitting signals received from the mobile at excessively high power levels.

A mobile driving in close to the booster can exceed the input range of the booster If this happens, the RSSI signal level measuring circuitry may no longer function properly. As a result, the booster output exceeds a maximum output desired threshold. When this happens, booster circuitry reacts as if the excessive output is due to an oscillation condition and therefore permanently reduces gain. Thus, any mobile which drives to within overload range of the booster could permanently impair booster operation.

In addition, if the gain of the booster should be set too high for the surrounding conditions, an oscillatory condition can result. Hence, it would be desirable to be able to limit the transmitter output power when a mobile unit comes close to the booster. It would also be desirable to be able to automatically reduce the gain of the booster, should oscillation take place, so as to terminate the oscillatory condition.

SUMMARY OF THE INVENTION

A method and an apparatus are provided for controlling output power in intelligence carrying radio frequency signals which have been detected and then amplified prior to transmission. The method includes the steps of receiving the intelligence carrying radio frequency signals from a mobile source; amplifying at least the intelligence carrying portion of the signals; transmitting a representation of at least the amplified intelligence carrying portion of the signals; detecting a selected condition, such as output power level, of the transmitted signals and automatically altering the gain or amplification in response thereto.

A repeater or booster which limits output power of transmitted radio frequency signals is usable with a mobile source. Such a repeater includes circuitry for receiving intelligence carrying radio frequency signals from the mobile source. Amplifiers are provided for amplifying at least the intelligence carrying portion of those signals. The amplifiers have an adjustable parameter, such as value of gain. Circuitry is provided for transmitting a representation of at least the amplified intelligence carrying portion of the signals and for detecting a selected condition, such as excessive power, at the output of the repeater. The gain of the amplifiers can be automatically altered in response to the detected output power level.

Numerous other advantages and features of the present invention will become readily apparent from the following detailed description of the invention and the embodiments thereof, from the claims and from the accompanying drawings in which the details of the invention are fully and completely disclosed as a part of this specification.

DETAILED DESCRIPTION OF THE PREFERRED EMBODIMENT

Figure 1:
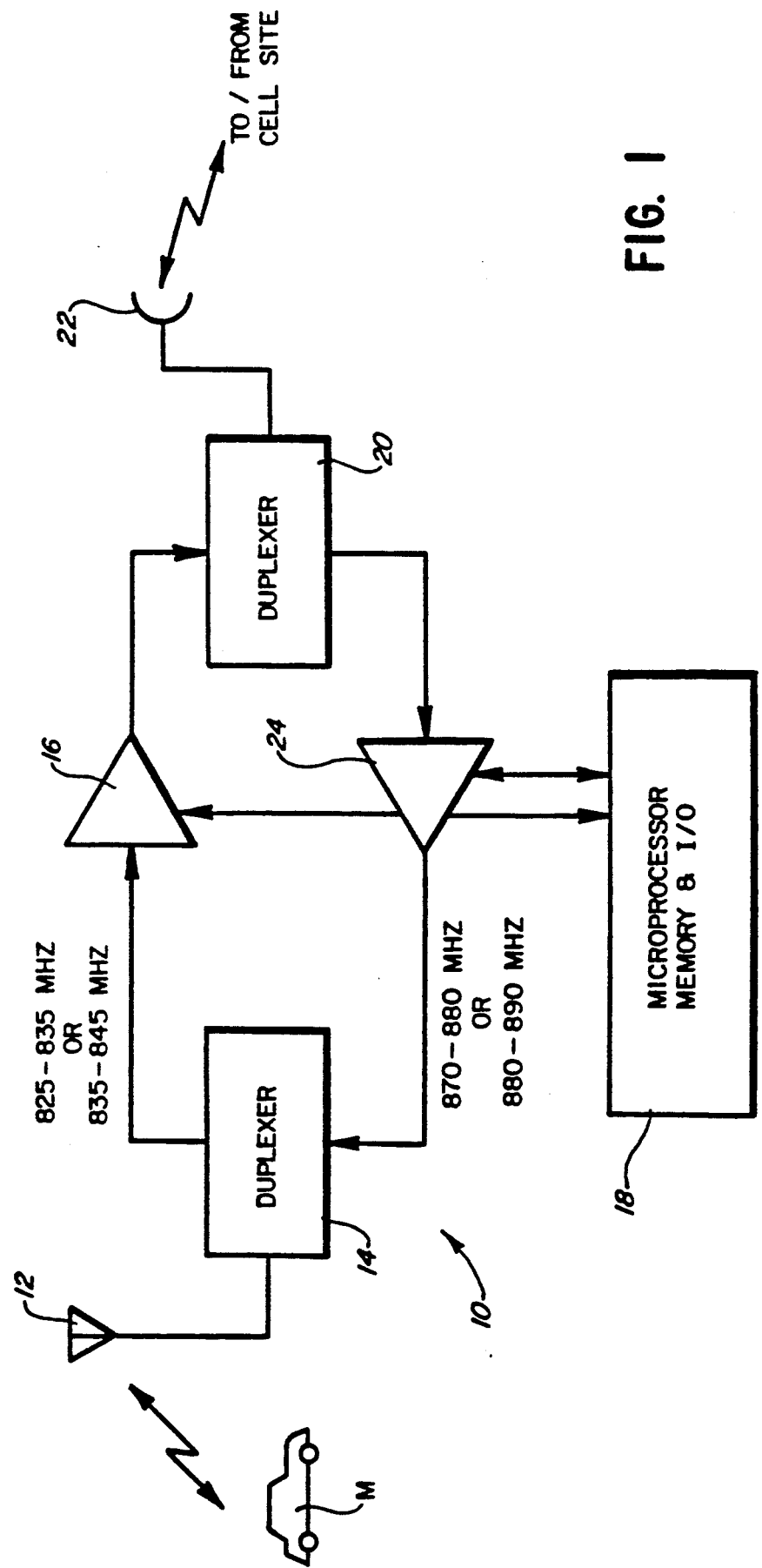
FIG. 1 is an overall block diagram of one form of a repeater in accordance with the present invention.

While this invention is susceptible of embodiment in many different forms, there is shown in the drawing and will be described herein in detail a specific embodiment thereof with the understanding that the present disclosure is to be considered as an exemplification of the principles of the invention and is not intended to limit the invention to the specific embodiment illustrated.

FIG. 1 illustrates a cellular booster or repeater 10 in accordance with the present invention. The booster 10 includes a mobile directed antenna 12 for transmission to and reception from a mobile unit M in the general vicinity of the repeater 10.

The antenna 12 is coupled to an antenna input/output port of a duplexer 14. An output port of the duplexer 14 is coupled to a wide band amplifier 16. The amplifier 16 has a gain parameter which is adjustable by a microprocessor control unit 18.

Output from the wide band amplifier 16 is coupled to a duplexer 20. An antenna 22 is coupled to an antenna input/output port of the duplexer 20. A second wide band amplifier 24 is coupled between the duplexer 20 and the duplexer 14.

The microprocessor 18 controls the operation of the repeater 10 and adjusts the gain thereof in accordance with sensed conditions as discussed subsequently. More particularly, with respect to FIG. 1 and the mobile M, when that mobile moves close to the booster 10, signals arriving at the antenna 12 from the mobile M may exceed the input range of the booster.

As is well known, and was described in the previous Leslie et al. Patent Application incorporated herein by reference, one aspect of the operation of the microprocessor 18 is to continuously measure the radio signal strength indicator (RSSI) associated with the input signals from the mobile M.

When a mobile drives near the booster, the measured input signal level is used to reduce the gain of the booster to maintain its output below the desired output power level. However, when a mobile operates very closely to the booster, the mobile's signal level exceeds the signal level measurement capabilities of the RSSI circuitry (typically signals above $+40$ to $-30$ dBm) in the booster, and the output power will exceed its desired level.

The output power level is measured via a coupling loop on the output of the power amplifier, with a DC voltage proportional to the output power being generated. This DC voltage is calibrated in a control program in the microprocessor to represent the output power level being measured. When the pre-determined output level is exceeded, the control program will reduce the gain through the booster by a specified number of dB until the output power falls below the desired output level.

The microprocessor control program will next look at the input signal level, and will note that the input level is "at maximum". When the near-by mobile drives away or ends the call, the input level will drop below the "at maximum" input threshold, and the software will restore the booster to its normal gain setting.

If the gain of the booster is such that it is equal to or greater than the antenna isolation, then the booster will oscillate. When the booster oscillates, the booster output will tend to go to "full output" generally greatly exceeding the predetermined desired output power threshold. When this happens, the microprocessor 18 will automatically reduce the gain by a predetermined number of dB (in several steps if necessary) until the output power level falls below the desired threshold.

The microprocessor control program will next look at the input signal level, and will determine that it is not a close-by mobile by virtue that the measured input signal will be below the maximum input threshold. Since a close-by mobile could have caused this situation to occur, the microprocessor control program will restore the original gain setting a pre-determined number of times to see if the excessive output condition persists. If the booster indeed oscillates at the original gain setting, then the microprocessor control program will permanently set the booster gain to the setting which prevents oscillation, and will generate any appropriate alarms to indicate that a permanent change in booster status has been made.

The above capability allows the booster 10 to be installed without particular regard to antenna isolation. The booster 10 will automatically self-correct to find the gain point at which stable operation is achieved. This approach is different than that incorporated in a system and method where actual isolation is measured across the band to determine the optimum point of operation.

Figure 2:
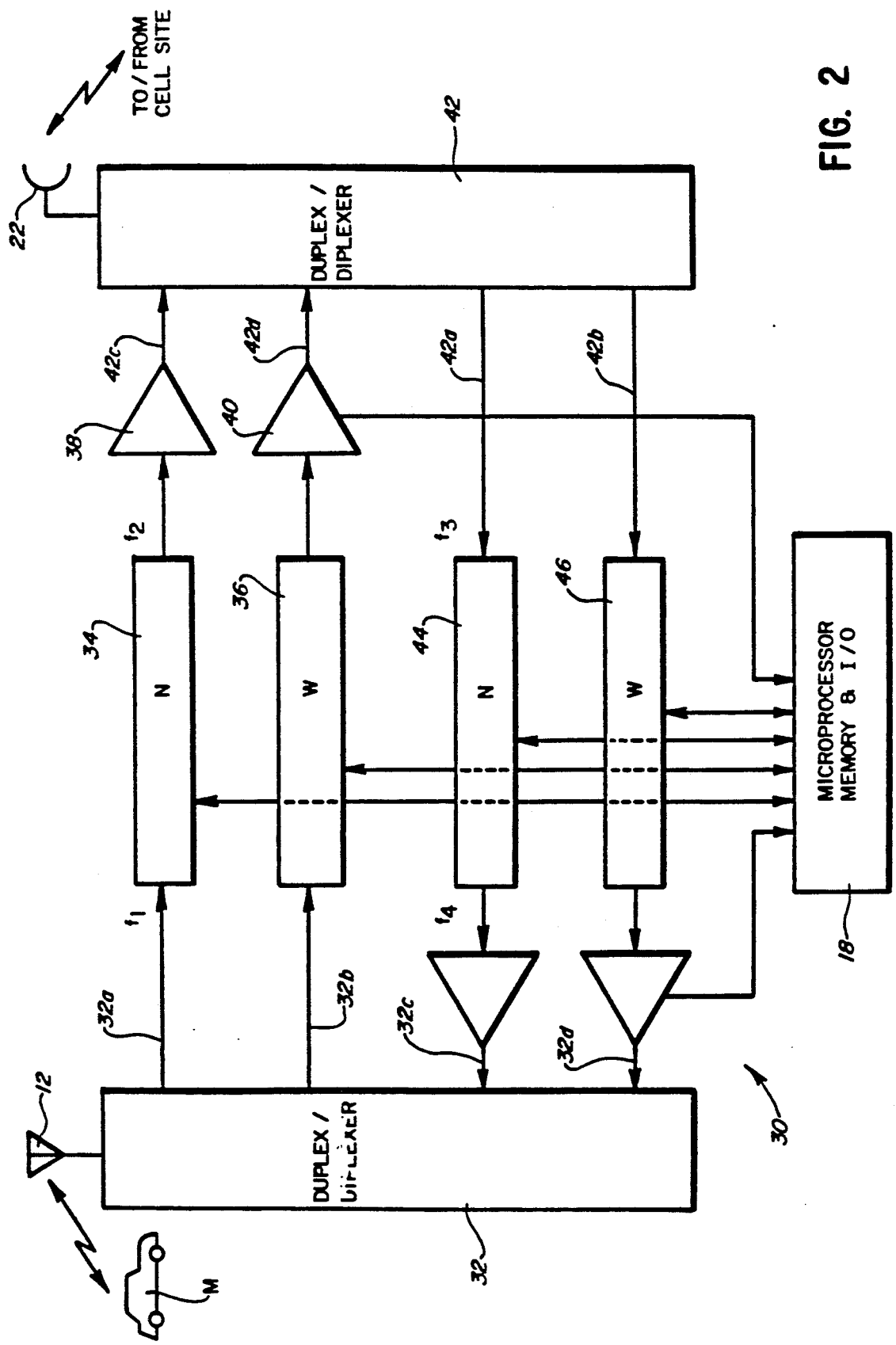
FIG. 2 is an overall block diagram of an alternate form of repeater in accordance with the present invention.

FIG. 2 is a block diagram of an alternate repeater structure 30 also usable to improve communications between the mobile unit M and a remote cell site. Elements of the booster 30 which correspond to the booster 10 have been given the same identification numeral. Signals from the antenna 12 or to the antenna 12 are coupled to or originate at a duplexer/diplexer 32 with first and second outputs 32A and 32B along with first and second inputs 32C and 32D.

Outputs 32A and 32B from the duplexer/diplexer 32 are coupled to narrow band filter/amplification channel 34 and wide band filter/amplification channel 36. The narrow band channel can be used to amplify and frequency shift one of the control channels for the cellular system which has been assigned to that particular cell site. The wide band filter and amplifier branch 36 can filter and amplify the voice channels for the corresponding provider. No frequency shift is provided for the wide band voice channels 36.

Both the narrow band filter and amplification channel 34 and the wide band filter and amplification channel 36 can be implemented in accordance with the disclosure of the Leslie et al. patent application incorporated herein by reference. Output from the filter and amplification channel 34 is amplified in a power amplifier 38. Output from the wide band filter and amplification channel 36 is amplified in a power amplifier 40. Outputs from the power amplifiers 38 and 40 are coupled to inputs 42c and 42d of a duplexer/diplexer 42.

Outputs from the duplexer/diplexer 42a and 42b are coupled to narrow band filter and amplification channel 44 and wide band filter and amplification channel 46. The filter and amplification channels 44 and 46 correspond in structure and function to the narrow band and wide band channels 34 and 36 as previously discussed.

Under control of the microprocessor 18 gain of the repeater 30 can be adjusted so as to minimize excess power output in the event the mobile M moves close to the antenna 12. In addition, the microprocessor 18 can adjust the gain of the unit 30 to automatically minimize oscillation as previously discussed.

It will be understood that other repeater structures could also be implemented in accordance with the present invention without departing from the spirit and scope thereof.

Figure 3A:
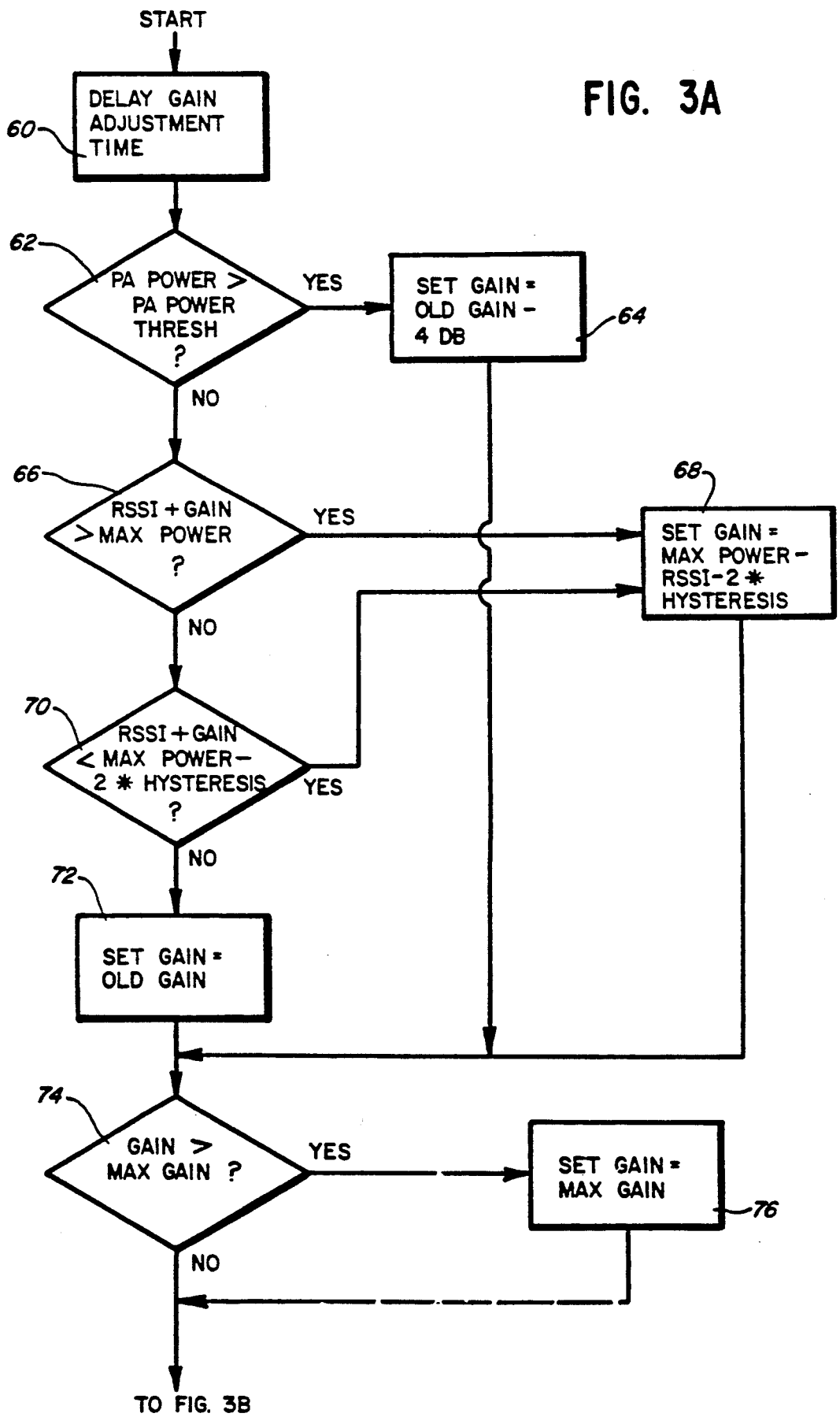
FIGS. 3A and 3B, taken together, are a block diagram illustrating steps of a method of control in accordance with the present invention.
Figure 3B:
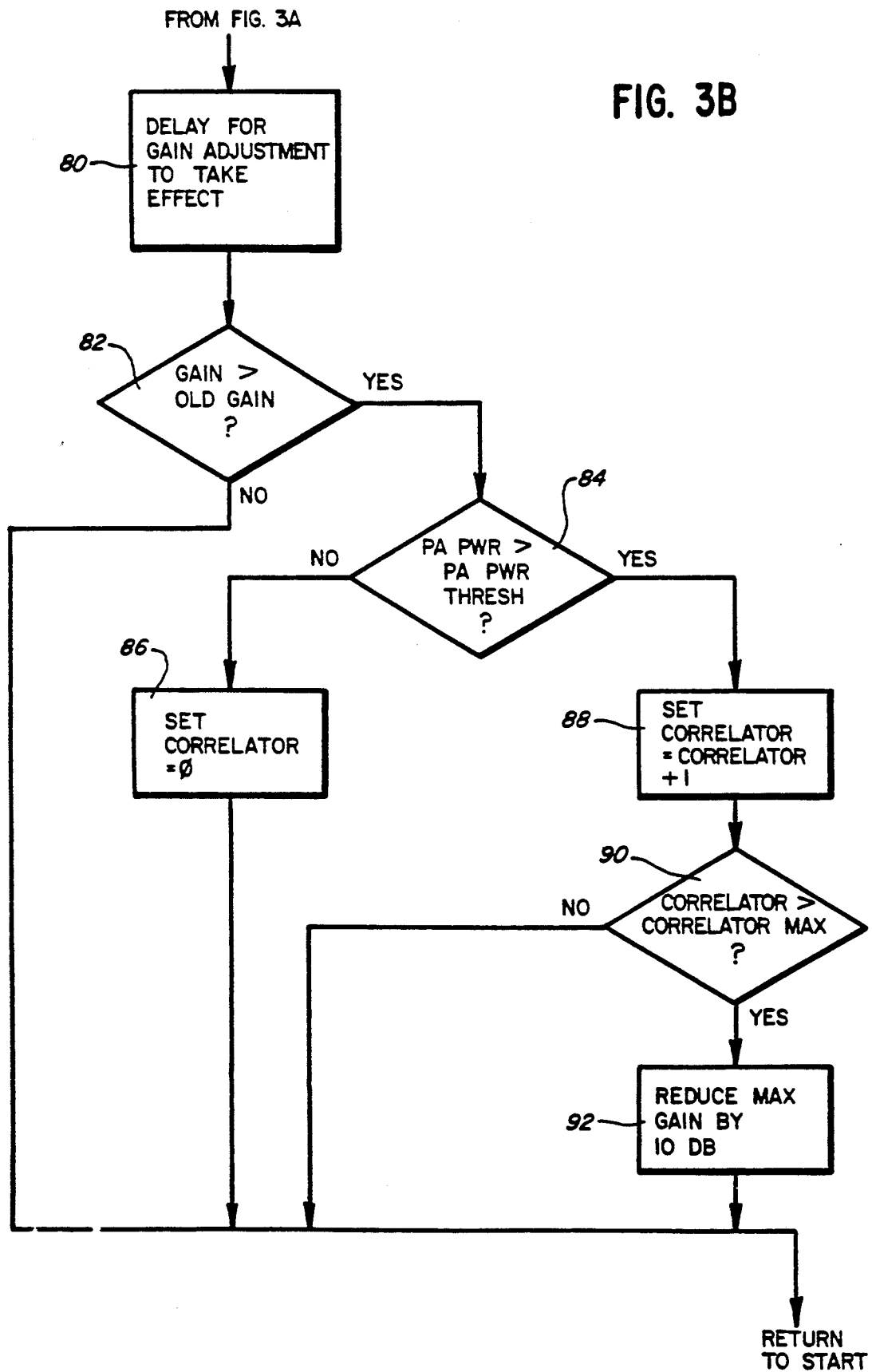

FIGS. 3A and 3B, taken together are a block diagram illustrating the functioning of a control program usable with the microprocessor 18 for the purpose of implementing a method in accordance with the present invention. In an initial step 60, a delay is provided on the order of 1 seconds to enable the previous gain adjustments to take effect. In a subsequent step 62, the power currently being generated by the radio frequency power amplifier 16 or 40 is compared with a prestored threshold output power level which is not to be exceeded. The threshold output power level is a level at or below where significant inter-channel modulation effects take place in the wide band amplifiers 16 or 40.

If the current output power from the amplifier 16 or 40 exceeds the predetermined maximum threshold, in a step 64, gain is reduced on the order of 4 dB. In event that the current amplifier output level does not exceed the predetermined threshold in the step 62, in a step 64 the current RSSI level is added to current gain (both in dB) and compared to a maximum output power threshold (in dB) corresponding to the previously discussed output power amplifier threshold.

In the event that amplifier output power, determined in step 66, exceeds the max power threshold in a step 68, gain is set to a value equaling the maximum power threshold less RSSI value less two times the hysteresis parameter. (Hysteresis is a parameter which controls the extent to which the output signal can vary before a gain adjustment is made, perhaps on the order of 6 dB.) In the event that the computed output power in the step 66 does not exceed the maximum output power threshold, in a step 70, the computed output power is compared to the value of the maximum power threshold reduced by two times the hysteresis parameter.

In the event that the computed output power is less than the maximum power threshold reduced by two times the hysteresis parameter, the current value of gain is set to the previous value of gain in a step 72. In the step 74, the current value of gain is compared to the maximum value. The maximum value of gain is that threshold value which has been previously determined to be the maximum that should be used under low signal conditions.

In the event that the gain exceeds the predetermined maximum, in a step 76 the current gain is set to the maximum value of gain. In a step 80, a delay on the order of a half of second is provided to enable the gain adjustment to take effect.

The steps of FIG. 3B detect the presence of an oscillatory condition. A correlation between gain increases and high output power must be present before an oscillatory condition is detected.

In a step 82, the system checks to determine whether or not current gain exceeds old gain. If not, it returns to step 60 and re-executes the process. If yes, in a step 84, the actual output level of the amplifier 16 or the amplifier 40 is compared to the maximum desired output power threshold.

If actual power does not exceed the predetermined maximum threshold a correlator parameter is set to a value of zero in a step 86. The correlator parameter is used for the purpose of keeping track of the number of times that the oscillatory condition has been detected. In the event that the actual power amplifier output level exceeds the predetermined threshold in a step 88, the value of the correlator parameter is increased by 1.

In a step 90, the current value of the correlator parameter is compared to a predetermined maximum threshold value. In the event that the current value of the correlator parameter is less than the predetermined maximum, the system returns to step 60 and reloops through the process to recheck the output power. In the event that the current value of the correlator parameter exceeds the predetermined maximum threshold the value of the maximum gain threshold is automatically reduced by 10 dB. The system then returns to step 60 and reinitiates execution of the method.

The use of the correlator parameter takes into account circumstances where, in non-oscillatory cases, gain increases might be followed by excessive output power readings once or twice in a row. Hence, the method of FIG. 3 does not automatically force a reduction in the maximum gain value, step 92, unless the oscillatory condition, indicated by excessive output power, has been detected on several successive loops through the method.

While the present method and apparatus have been described with respect to a radio transceiver mounted in a vehicle, it will be understood that the present invention may be used with other non-stationary sources, such as portable cellular units, not mounted in vehicles.

From the foregoing, it will be observed that numerous variations and modifications may be effected without departing from the spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. A self-adjusting cellular-type repeater for receiving radiated electro-magnetic signals from a remote, movable transmitter and for transmitting representations of same to a remote fixed receiver comprising:
   means for receiving the radiated electro-magnetic signals from the remote movable transmitter at a first frequency;
   a power amplifier for amplifying at least representations of the received signals, said power amplifier including an adjustable gain parameter having an initial value;
   means, including an antenna, for transmitting representations of the amplified signals to the remote receiver at a second frequency;
   means, coupled to an output of said amplifier, for detecting an output power level in the repeater in excess of a predetermined threshold resulting form the movable transmitter moving toward said receiving means and means for adjusting said parameter in response thereto so as to reduce said output power level; and
   means, coupled to an input to said power amplifier, for monitoring said received signals and for restoring said gain parameter to said initial value after detecting a termination of the signals from the movable transmitter.

2. A repeater as in claim 1 including means for translating said second frequency to a value different from said first frequency.

3. A repeater as in claim 1 with said adjusting means including means for incrementally reducing said gain parameter and for testing for a termination of said excess power level condition.

4. A repeater as in claim 1 including means for detecting an oscillatory condition therein and for reducing said gain parameter so as to terminate said condition.

5. A method of adjusting the gain of an amplifier of a radio frequency booster capable of amplifying a received radio frequency signal received at a first power level so as to minimize oscillation comprising:
   comparing current output power of the amplifier to a predetermined threshold;
   reducing the gain of the amplifier a predetermined incremental amount in the event that the output power exceeds the threshold;
   determining the expected output power level of the received radio frequency signal when amplified by the amplifier;
   comparing the expected output power level to the predetermined incremental threshold and reducing the gain a predetermined amount in the event that the output power level exceeds the predetermined threshold; and
   comparing the current value of gain to a predetermined maximum value and in response to exceeding that maximum value reducing the current value of gain thereto.

6. A method as in claim 5 including:
   determining if the current gain value exceeds the prior gain value and if so, comparing current output power of the amplifier to the predetermined threshold;
   incrementing an oscillatory indicium in response to current output power exceeding the threshold; and
   reducing the value of gain by a second incremental amount in response to the indicium exceeding a predetermined value.

7. A method as in claim 6 including:
   setting the oscillatory indicium to an initial value in response to current output power not exceeding the threshold.

* * * * *

UNITED STATES PATENT AND TRADEMARK OFFICE
CERTIFICATE OF CORRECTION

PATENT NO. : 5,095,528

DATED : March 10, 1992

INVENTOR(S) : Leslie et al.

It is certified that error appears in the above-identified patent and that said Letters Patent is hereby corrected as shown below:

Column 6, line 14, change "form" to --from--.

Signed and Sealed this

Third Day of August, 1993

Attest:

MICHAEL K. KIRK

*Attesting Officer*  Acting Commissioner of Patents and Trademarks